Jan. 2, 1968  E. H. BADGER  3,360,981

LEAK RATE DETECTOR

Filed Jan. 11, 1966  2 Sheets-Sheet 1

INVENTOR.
EVERETT H. BADGER

BY Sulwider, Patton, Rieber,
Lee & Utecht
ATTORNEYS

Jan. 2, 1968     E. H. BADGER     3,360,981
LEAK RATE DETECTOR
Filed Jan. 11, 1966     2 Sheets-Sheet 2
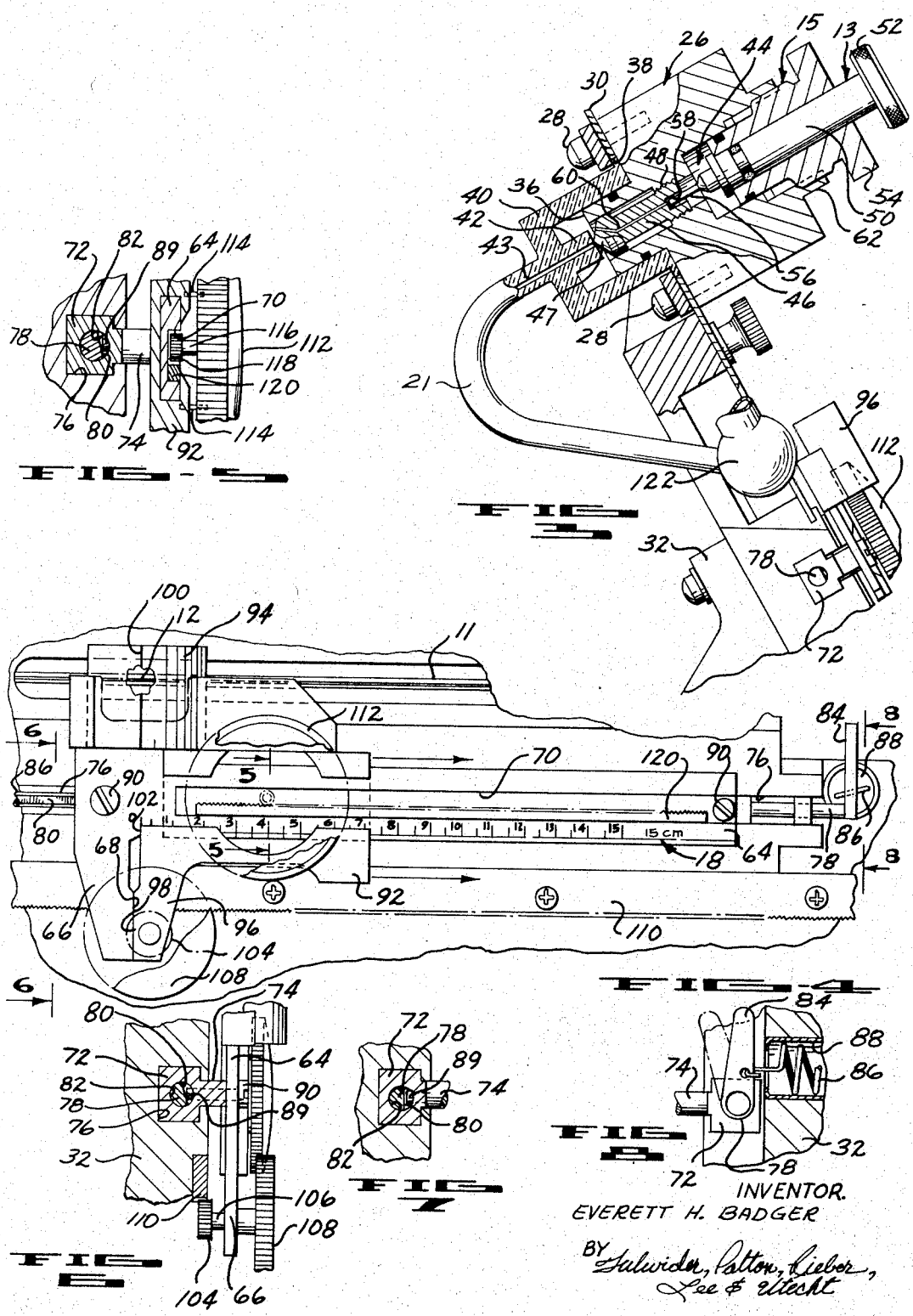
INVENTOR.
EVERETT H. BADGER
BY Fulwider, Patton, Rieber, Lee & Utecht
ATTORNEYS United States Patent Office 3,360,981
Patented Jan. 2, 1968

3,360,981
LEAK RATE DETECTOR
Everett H. Badger, La Habra, Calif., assignor to Accessory Products Co., a division of Textron, Inc., Whittier, Calif., a corporation of Rhode Island
Filed Jan. 11, 1966, Ser. No. 519,849
12 Claims. (Cl. 73—40)

ABSTRACT OF THE DISCLOSURE

A leak detector including an elongated tube of predetermined and uniform cross-sectional flow area, one end being in communication with a constant reference pressure and the other end being adapted for connection with a device to be tested. Piston means in the tube and movable therealong in response to pressure differentials across such means. A pair of shut-off valves connected together by porting, each of such valves being connected with a respective end of the tube. Piston positioning means in the porting for controlling the initial position of the piston means, such positioning means including a piston housing and associated piston.

---

The present invention relates to fluid leak detecting equipment and, more particularly, to improved fluid leak rate measuring device or detector.

Generally speaking, most presently available fluid leak detecting apparatus are designed to detect the presence of fluid leaks rather than the rate of fluid leakage from a device or item under test. That is, the apparatus are of a qualitative rather than a quantitative character. Often, however, it is desirable to determine the rate at which fluid is leaking from a given device, such as a valve. Unfortunately, most qualitative leak detecting apparatus are not adaptable to measuring leak rate, while instruments which have this capability are generally very complex, difficult to calibrate, and expensive to manufacture and maintain. Moreover, presently available instruments for measuring fluid leak rate do not give reliable measurements for extremely small leakages in the order of $10^{-3}$ to $10^{-7}$ s.c.c./sec. (standard cubic centimeters per second) and are often limited to the detection of a particular gas or gases.

Accordingly, it is an object of the present invention to provide an improved fluid leak rate detector which is simple in design and inexpensive to manufacture and maintain.

Another object of the present invention is to provide an improved leak rate detector which will operate on substantially all gases and which is capable of accurately and reliably measuring leak rates of the order of $10^{-3}$ to $10^{-7}$ s.c.c./sec.

A further object of the present invention is to provide an improved leak rate detector of the foregoing character which is easily calibrated and simple to operate.

The foregoing, as well as other objects and advantages of the present invention may be more clearly understood by reference to the following detailed description when considered with the drawings which, by way of example only, illustrate one form of leak rate detector embodying the features of the present invention.

In the drawings:

FIGURE 3 is a partially sectioned, fragmentary left side view of the leak rate detector of FIGURE 1;

FIGURE 4 is a fragmentary front view, slightly expanded, of the scale assembly of the detector illustrated in FIGURE 1;

FIGURE 5 is a fragmentary sectional view taken along the line 5—5 in FIGURE 4;

FIGURE 6 is a fragmentary sectional view taken along the line 6—6 in FIGURE 4;

FIGURE 7 is a fragmentary sectional view of a portion of the apparatus illustrated in FIGURE 6; and FIGURE 8 is a fragmentary sectional side view taken along the line 8—8 in FIGURE 4.

Figure 1:
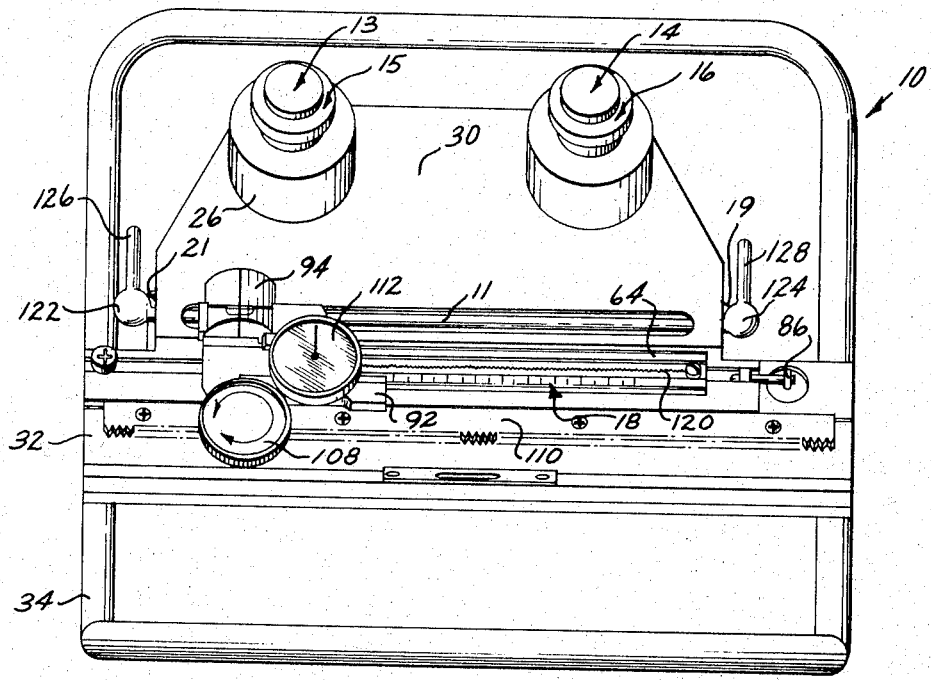
FIGURE 1 is a front view of the leak rate detector.

In the drawings, the leak rate detector is represented generally by the numeral 10 and in one basic form includes a tube 11, a piston means 12 in the tube, a pair of shut-off valves 13 and 14, a pair of piston positioners 15 and 16, and a scale 18 stationed along the tube.

The tube 11 is preferably a straight, horizontal, glass or plastic tube of uniform cross-sectional area open at the right end to atmosphere, or some other constant fluid pressure source, and connected by tubing 19 to the valve 14. The left end of the tube 11 is adapted for connection to a device 20 under test for internal fluid leakage and by tubing 21 to the valve 13. The valves 13 and 14 are connected by tubing 22 while the piston positioners 15 and 16 are located between the valves 13 and 14 and are adjustable to exert fluid pressures on the piston 12 to control its initial position and movement within the tube.

The piston 12, which may be a drop of oil or other suitable liquid, a quantity of foam, or even a lubricated solid piston, blocks the tube 11 and is adapted for sliding movement therealong in response to differences in fluid pressure on opposite sides thereof. In the leak rate detector 10, the piston 12 is moved along the tube 11 by fluid leaking from the device 20 into the left end of the tube 11 and the movement is measured by the scale 18 to provide a measure of the rate of fluid leakage.

Figure 2:
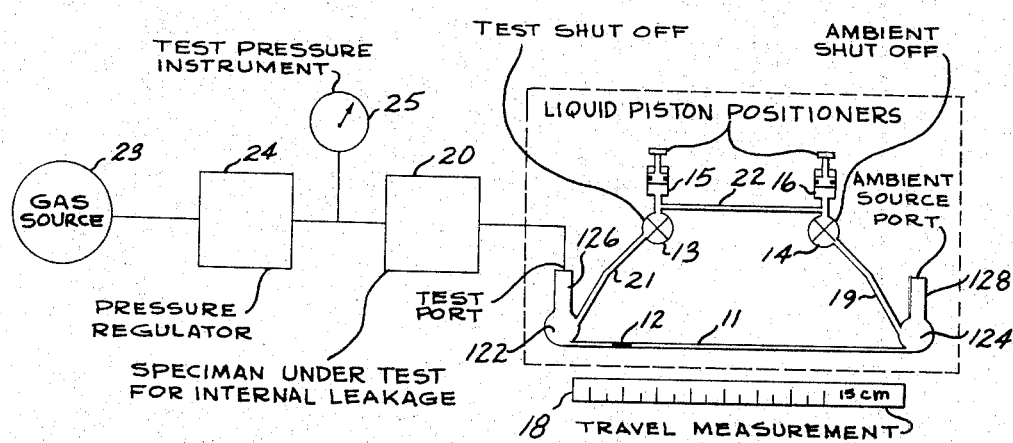
FIGURE 2 is a schematic showing the leak rate detector connected to a device under test and apparatus for supplying gas to the device.

More particularly, and with reference to FIGURE 2, to operate the leak rate detector 10, the piston 12 is initially positioned at the left end of the tube 11 over the zero mark on a scale 18. This may be accomplished by closing the valve 14 and operating either piston positioner 15 or 16 to develop a pressure at the left end of the tube 11 less than atmospheric pressure. When a predetermined minimum pressure differential is developed across the piston 12, the piston moves to the left in the tube. When the piston is over the zero mark on the scale 18, the operating piston positioner may be controlled to increase the pressure at the left end of the tube to halt movement of the piston. The shut-off valve 14 is then reopened to balance the pressures on the opposite sides of the piston 12.

Next, the output of the test device 20 is connected to the left end of the tube 11. The test device 20, which may be a valve, is normally closed in order that internal leakage through the test device may be detected and the rate thereof measured. The input to the test device is connected to a gas source 23 through a pressure regulator 24. A pressure gauge 25 monitors the pressure of the gas applied to the input to the test device 20. Any gas initially leaking through the test device 20 passes through the open shut-off valves 13 and 14 to atmosphere. The open shut-off valves therefore provide a by-pass for any high initial fluid leakage through the test device when the gas is first applied to its input.

The valves 13 and 14 are then closed and fluid leaking through the test device 20 enters the left end of the tube 11. As the fluid enters the tube 11, it builds up a pressure on the left side of the piston 12. When a predetermined pressure differential is developed across the piston 12, it moves to the right along the tube 11. The piston is allowed to move for a predetermined period of time, such as a minute, at which time the shut-off valves 13 and 14 are again opened to equalize the pressures within the tube 11 and to halt movement of the piston. The position of the piston is then noted and its length of travel measured to provide an indication of the flow rate of a fluid through the test device.

Thus described, the leak rate detector 10 is a timed displacement measuring device in which a predetermined minimum pressure differential, of the order of 0.001 p.s.i., is developed across the piston 12 to produce movement of the piston toward one end or the other of the tube 11. Once the pressure differential is achieved, the piston 12 moves along the tube either to the right or the left, depending on whether the device is under pressure or vacuum. As the piston moves along the tube, for example, to the right, the volume to the left of the piston increases. Therefore, to maintain the pressure differential across the piston 12, fluid is introduced into the left end of the tube 11. The rate at which fluid enters the left end of the tube 11 to maintain the pressure differential determines the rate of travel of the piston 12 along the tube, and hence the distance traveled by the piston during a given time. Knowing the distance traveled in a given time, the rate of fluid leakage from the test device 20 into the tube may be determined using the formula:

$$R_L = 10^{-3} \left( \frac{AL}{T} \right)$$

where, $R_L$, is the leak rate from the device 20 in standard cubic centimeters per second, A is the average cross-sectional area of the tube 11 in square millimeters, L, is the distance traveled by the piston 12 in millimeters, and T, is the test time in seconds.

In practice, the test time may be kept with a stop watch. Alternatively, the entire operation of the leak rate detector 10 may be controlled and timed electronically and a direct read-out of leak rate provided by the electronic equipment.

In practice, when measuring very low leakage rates, it may take a considerable length of time before the pressure at the left end of the tube 11 builds up to a point where the minimum pressure differential is created across the piston 12. In the illustrated form of the present invention, the waiting time may be eliminated by operation of either of the piston positioners 15 or 16. In particular, after the piston 12 has been positioned at the left end of the tube 11 and the test device 20 connected to the tube wih gas supplied to its inlet, the shut-off valve 14 may be closed. Thereafter, rather than waiting for fluid leakage through the test device 20 to build up pressure at the left end of the tube, either of the positioners 15 or 16 may be operated to increase the fluid pressure at the left end of the tube through the open shut-off valve 13.

As the pressure at the left end of the tube 11 is increased and reaches the predetermined minimum pressure differential, the piston 12 begins to move toward the right end of the tube. The shut-off valve 13 is then immediately closed. Thereafter, the piston 12 moves at a rate determined directly by the rate of fluid leakage from the test device 20. The time measurement of the travel of the piston then provides a direct measure of the fluid leakage rate by application of the foregoing formula.

A preferred form of the piston positioner 15 in combination with the shut-off valve 13 is illustrated most clearly in FIGURE 3. As represented, the combination of the shut-off valve 13 and piston positioner 15 includes a mounting block 26 connected by screws 28 to a mounting front plate 30 for the detector 10. The front plate 30 extends upwardly and is inclined rearwardly from a horizontally extending base housing 32. The base housing is connected to and supported by a metal frame 34 (see FIGURE 1) which also extends upwardly over the top of the front panel 30 to act as a handle for use in hand carrying the detector 10 from one location to another.

The mounting block 26 is generally cylindrical and includes an end portion 36 of reduced cross-sectional area which fits into and passes through an opening 38 in the front plate 30. Thus positioned, the end portion 36 is tightly received by a socket 40 secured at one end in the opening 38 and having a base projection 42 aligned with a central bore 44 extending through the mounting block. The socket 40 comprises an end coupling for the tubing 21 from the left end of the tube 11 to the piston positioner 15 and shut-off valve 13 and the bore 43 of the tubing 21 passes through the projection 42 such that the projection defines a valve seat for the shut-off valve 13.

In this regard, a valve stem 46 is located in one end of the bore 44 and includes an enlarged head 47 for seating against the valve seat 42 to seal the bore 43. The head 47 is supported for sliding movement along the bore 44 while the opposite end of the valve stem is threaded and mates with a threaded portion 48 of the bore.

To turn the valve stem 46, and hence advance and retract the head 47 within the bore 44 toward and away from the valve seat 42, the shut-off valve 13 includes a control rod 50 extending outwardly from the mounting block 26 and terminating in a knob 52. The rod 50 is supported in an enlarged outer end of the bore 44 within an adjusting nut 54. The opposite end of the rod 50 is flattened at 56 and extends into a generally rectangular slot 58 in the end of the valve stem 46. Thus arranged, a turning of the knob 52 causes the rod 50 to act much as a screwdriver in turning the valve stem 46 to move the head 47 toward and away from the valve seat 42. In this manner, the shut-off valve 13 is selectively opened and closed during operation of the leak rate detector 10.

In this respect, it should be noted that the shut-off valve 13, as well as the valve 14 in combination with the positioned 16, is of a nondisplacement type. That is, an opening and closing of the shut-off valve 13 does not, of itself, change the pressure of the fluid in the tubing 21. This is accomplished by maintaining a constant volume chamber around the valve stem 46 and valve seat 42. To maintain such a constant volume chamber, a passageway 60 extends through the head 47 of the valve stem 46 upwardly through the valve stem to communicate with the slot 58. Thus, as the valve stem 46 moves in and out toward and away from the valve seat 42, the volume immediately around the valve seat increases and decreases while the volume within the enlarged portion of the bore 44 between the valve stem and the bottom of the adjusting nut 54 decreases and increases to define a constant volume chamber around the valve stem and valve seat.

Therefore, during operation of the shut-off valve, pressure in the tubing 21 is not changed. This is very important since the balance of fluid pressures on the piston 12 is rather critical in the detector 10 and any undesired increase or decrease in pressure in the tubing 21 may cause undesired movements of the piston 12 resulting in inaccurate measurements of fluid leak rate.

In the combination of the shut-off valve 13 and piston positioner 15, the adjusting nut 54 comprises the control portion of the piston positioner. In particular, a turning of the adjusting nut 54 in a threaded sleeve 62 around the bore 44 causes the adjusting nut to move in and out of the bore. This produces a change in the volume of the chamber around the valve stem 46 and valve seat 42 and directly affects the fluid pressure in the tubing 21 leading to and at the left end of the tube 11. In particular, movement of the adjusting nut 54 toward the valve stem 46 causes the volume of the chamber to decrease and increases the fluid pressure at the left end of the tube 11, while movement of the adjusting nut 54 away from the valve stem increases the volume of the chamber and reduces the fluid pressure at the left end of the tube. As previously described, such control provides means for both initially positioning the piston 12 at the left end of the tube 11 and for imparting initial movement to the piston at the start of the timed operation of the leak rate detector 10.

To insure that the zero marking on the scale 18 is aligned with the moving piston 12 at the start of the test time, the scale is movable to follow the initial travel of the piston up to the start of the timing operation. Thereafter, the scale 18 is stationary to provide means for measuring the distance traveled by the piston 12 during the test time.

The structural arrangement of the movable scale 18 is most clearly illustrated in FIGURES 1 and 4 through 8. In particular, the scale 18 comprises a ruler 64 extending horizontally along the front of the base housing 32 below the tube 11 with a flanged end 66 extending downwardly from the left end of the ruler. The flanged portion 66 includes a vertical edge 68 which, as will be described hereinafter, acts as a contact surface for the ruler 64 against a slide member 92 in imparting movement to the ruler 64 toward the left side of the detector 10.

The front face of the ruler 64 carries a scale divided into centimeters and a generally rectangular, horizontal slot or recess 70 extending from adjacent the flange 66 to the right side of the ruler. The ruler 64 is supported for horizontal sliding movement along the front of the detector by means of a pair of rectangular guide blocks, or sliders, 72 connected by pins 74 to the back of the ruler at opposite ends thereof. The guide blocks 72 are adapted to ride in a rectangular, horizontal recess or slot 76 in the front of the base housing 32. Extending the length of the slot 76 is a guide rod 78 having a flattened face 80. The guide rod 78 extends through holes 82 in the guide blocks 72 with the flat face 80 facing in the general direction of the ruler 64. Thus, in moving back and forth along the slot 76, the guide blocks 72 travel along the guide rod 78.

In addition to providing guide means for the blocks 72, the guide rod 78 comprises an important part of the means for holding the ruler 64 stationary, once the test time begins. In particular, the guide rod 78 is rotatable about its central axis, in response to movement of a lever arm 84 connected to the right end thereof. As illustrated most clearly in FIGURE 8, the top end of the lever arm 84 is spring-biased toward the front of the base housing 32 by a coil spring 86 connected at one end to the lever arm and stationed within a recess 88 in the base housing. In this position of the lever arm 84, the flat face 80 of the rod 78 is inclined slightly and engages the tip ends 89 of screws 90 extending through the connecting pins 74. The contact between the tip ends 89 and the flat face 80 secures the ruler 64 to the rod and prevents movement thereof either to the left or the right.

As the lever arm 84 is turned away from the front of the base housing 32, however, the flat face 80 turns with the rod 78, parallel to the ruler 64 and as illustrated most clearly in FIGURE 7, moves out of contact with the tip ends 89 of the screws 90. This allows the guide blocks 72 to slide within the slot 76 and allows the ruler 64 to move back and forth along the front of the base housing 32, below the tube 11. In this manner the zero indication on the ruler 64 may be maintained in alignment with a particular edge of the piston 12 within the tube.

In order to provide means for positioning the ruler 64 along the front of the base housing 32, as well as providing means for following the movement of the piston 12 after the start of a test time and indicating the distance traveled by the piston during the test time, the scale assembly 18 includes the slide member 92. The slide member 92 is generally channel-shaped and is adapted to receive and fit around the ruler 64 with marginal edges extending inwardly over the top and bottom of the ruler to clamp the slide member thereto (see FIGURE 5).

The slide member 92 supports a magnifying glass 94 over the front of the tube 11 and includes a downwardly extending flange 96 at the left end of the slide having a flat edge 98 for engaging the flat edge 68 of the flange 66. The magnifying glass 94 includes a hairline 100 aligned with a left edge 102 of the slide member. When the flat edges 68 and 98 are in contact with each other, the left edge 102 of the slide member 92 and the hairline 100 are aligned with the zero marking on the ruler 64. Also, when the flat edges 68 and 98 are in contact with each other, and the guide rod 78 is released from the tip ends 89 of the screws 90, the slide member 92 and ruler 64 are adapted to move together along the front of the base housing 32 to allow the edge 102 and hairline 100 to follow the travel of the piston 12 prior to the start of the test time.

To accomplish this, a pinion gear 104 is connected by a shaft 106 through the flange 96 to a control knob 108. The pinion 104 is adapted to engage a rack 110 connected to the front of the base housing 32, below the slot 76. A turning of the knob 108 produces a turning of the pinion 104 causing the pinion 104 to move along the rack 110. When the ruler 64 is held stationary by the tip ends 89 and the screws 90 engaging the guide rod 78, a counterclockwise turning of the knob 108 causes the slide member 92 to move to the right along the ruler 64 thereby allowing the left edge 102 and the hairline 100 to follow the movement of the piston 12 within the tube 11. However, when the ruler 64 is free from the guide rod 78, a turning of the knob 108 in a counterclockwise direction drives both the slide member 92 and the ruler to the right. This is because the friction forces between the slide member 92 and ruler 64 are great enough to cause the ruler to follow movement of the slide member. Similarly, a clockwise turning of the knob 108 produces a movement of the ruler 64 with the slide member 92 to the left with the edges 68 and 98 bearing against each other.

In this manner, with the ruler 64 released from the guide rod 78, a turning of the knob 108 allows the zero marking of the ruler and the hairline 100 to follow the initial positioning movement of the piston 12. When it is desired to start the test time, the lever 84 is released, locking the ruler 64 in place. Thereafter, the piston 12 moves to the right along the ruler and a turning of the knob 108 allows the slide member 92 to follow the movement of the piston. At the end of the test time, the hairline 100 is again aligned with the piston 12 and the edge 102 lies at a point along the ruler 64 indicating the distance traveled by the piston during the test time. Knowing the distance traveled in the test time, the rate of leakage from the test device 20 may be computed using the formula previously described.

A dial gauge may also be incorporated to provide a direct visual indication of the distance traveled by the piston 12 during the test time. Such a gauge is represented by the numeral 112 and, as illustrated in FIGURE 5, is connected to the front of the slide member 92 by a pair of pins 114. A dial shaft 116 extends from the back of the gauge and carries a pinion gear 118 for riding along a rack 120 stationed within the recess 70 in the front of the ruler 64. Thus, as the slide member 92 travels along the ruler 64, the pinion gear 118 turns and travels along the rack 120 to produce a turning of the dial connected to the dial shaft 116. The gauge may be calibrated such that at the end of the test time, the dial will be pointing to a numeral indicative of the distance traveled by the piston during the test time.

Furthermore, as previously suggested, the operation of the leak rate detector 10 may be electronically controlled. Thus, for example, the turning of the guide rod 78 to release the ruler 64 may be controlled by an electromagnet which, when operated automatically starts an electronic counter. Electronic means may also be included for moving the slide member 92 or its equivalent, along the tube 11 to follow the movement of the piston 12 and to provide a direct readout of the leakage rate at the end of the test time.

During the initial positioning of the piston 12 within the tube 11 and during the operation of the leak rate detector 10, it is very important that the material forming the piston 12 not escape from the tube, either by being drawn into the test device 20 or blown into the atmosphere. To insure against such a possibility, the right and left ends of the tube 11 terminate in hollow, generally spherical bulbs 122 and 124. Also, vertical tube members 126 and 128 extend upwardly from the open tops of the bulbs. The tubing 19 and 21 terminate in the bulbs 124 and 122, respectively.

In operation, should the material comprising the piston 12 reach either the left or right end of the tube 11, it enters the enlarged area of one of the bulbs 122 or 124. The material also follows the curvature of the inner surface of the bulb, loses much of its momentum, and is captured within the bulb rather than blowing upwardly through the vertical tubes 126 and 128. Being captured within the bulbs 122 or 124, the material comprising the piston 12 may be drawn back into the tube by operation of the piston positioners 15 and 16, in the manner previously described.

The arrangement of the bulbs 122, 124 and vertical tubes 126 and 128 also allows the material comprising the piston 12 to be easily introduced into the tube 11, particularly when the piston is formed of a liquid material. In particular, the material forming the piston 12 may be introduced by a long syringe, or some other long tubular member, through the tubes 126 and 128 to either the left or right end of the tube 11 and positioned within the tube by means of the piston positioners 15 and 16.

From the foregoing description, it is appreciated that the present invention provides a fluid leak rate detector which is simple in design. Also, the leak rate detector will operate on all gases and in practice, has proven to give accurate and reliable measurements of leak rates in the order of $10^{-3}$ to $10^{-7}$ s.s.c./sec.

While a particular form of leak rate detector has been described in some detail herein, changes and modifications may be made in the illustrated form without departing from the spirit of this invention. It is therefore intended that the present invention be limited in scope only by the terms of the following claims.

I claim:
1. Apparatus for detecting the rate of internal fluid leakage from a test device connected to a fluid source, comprising:
   a tube of predetermined and uniform cross-sectional area including a first end for connection to said test device and a second end open to a reference fluid pressure supply;
   movable piston means in and blocking said tube and movable therealong in response to differences in fluid pressure in said tube on opposite sides thereof;
   first and second shut-off valves;
   porting between said first and second valves and between said first and second ends and said first and second valves, respectively;
   and piston positioning means in said porting between said first and second valves for developing fluid pressures in said tube for moving said piston means along said piston positioning tube, said means including a piston housing and associated piston.
2. The apparatus of claim 1, including a scale along said tube indicating the length of travel of said piston means therealong, thereby providing means for determining the rate of fluid leakage from said test device.
3. The apparatus of claim 2, wherein said scale is movable along said tube to follow the initial travel of said piston means.
4. The apparatus of claim 3 including means for locking said scale in place once measurement of said piston means travel is started.
5. The apparatus of claim 2, including a slide member movable along said scale to follow travel of said piston means and indicate on said scale the distance traveled by said piston means.
6. An apparatus as set forth in claim 5 that includes a magnifying glass mounted on said movable member and overlying said scale to assist the operator in aligning said member with said piston means.
7. An apparatus as set forth in claim 5 that includes:
   a rack extending longitudinally of said tube;
   a pinion mounted on said movable member and engaging said rack; and
   a knob for driving said pinion.
8. An apparatus as set forth in claim 2 that includes:
   a mounting plate for supporting said tube;
   a slider-receiving slot extending longitudinally of said tube;
   a pair of sliders supporting the opposite ends of said scale and carried in said slot, said sliders each including a bore extending longitudinally of said slot;
   an elongated guide rod supported from said plate and extending through said bores, said rod having at least one flat surface; and
   binding means projecting into one of said bores for abutting said flat surface upon rotation of said rod to frictionally hold said scale stationary relative to said tube.
9. An apparatus as set forth in claim 8 that includes biasing means supported from said mounting plate for maintaining said rod rotated, with said flat surface abutting said binding means.
10. The apparatus of claim 1, wherein said first and second ends include bulbs having chambers which are substantially larger in cross-section than the cross-sectional area of said tube.
11. The apparatus of claim 10, wherein said first and second ends further include tubes extending vertically from said bulbs.
12. An apparatus as set forth in claim 1 wherein one of said valves includes a port in communication with said first end of said tube through said porting, a first chamber adjacent said port, a second chamber spaced from said port, a wall separating said first and second chambers and forming a threaded bore aligned with said port, a valve stem screwed into said bore and including a valve seat for blocking said port, drive means for screwing said stem toward said port to press said valve seat against said port, and a passageway for communicating gas from said first chamber to said second chamber to maintain a constant pressure in said first chamber when said stem is screwed toward said port.

References Cited

UNITED STATES PATENTS

| | | | |
|---|---|---|---|
| 914,945 | 3/1909 | Gutwein | 33—209 |
| 1,863,007 | 6/1932 | Elkins | 33—125 |
| 3,043,129 | 7/1962 | King | 73—40 |
| 3,101,607 | 8/1963 | Taylor et al. | 73—40 |
| 3,269,698 | 8/1966 | Koch | 251—267 XR |

FOREIGN PATENTS

| | | |
|---|---|---|
| 871,968 | 3/1953 | Germany. |
| 585,422 | 2/1947 | Great Britain. |

LOUIS R. PRINCE, *Primary Examiner.*

DAVID SCHONBERG, *Examiner.*

JEFFREY NOLTON, *Assistant Examiner.*